(12) United States Patent
Fuller

(10) Patent No.: US 12,254,558 B2
(45) Date of Patent: Mar. 18, 2025

(54) RAY TRACING WITH SHARED TRAVERSAL

(71) Applicant: Microsoft Technology Licensing, LLC, Redmond, WA (US)

(72) Inventor: Martin Jon Irwin Fuller, Gaydon (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 160 days.

(21) Appl. No.: 18/083,383

(22) Filed: Dec. 16, 2022

(65) Prior Publication Data

US 2024/0177401 A1    May 30, 2024

Related U.S. Application Data

(60) Provisional application No. 63/428,328, filed on Nov. 28, 2022.

(51) Int. Cl.
  *G06T 15/06*  (2011.01)
  *G06T 7/70*   (2017.01)
  *G06T 15/08*  (2011.01)

(52) U.S. Cl.
  CPC ........... *G06T 15/06* (2013.01); *G06T 7/70* (2017.01); *G06T 15/08* (2013.01)

(58) Field of Classification Search
  None
  See application file for complete search history.

(56) References Cited

U.S. PATENT DOCUMENTS

| 2019/0035138 A1 | 1/2019 | Fuetterling |
| 2021/0390755 A1 | 12/2021 | Muthler |
| 2024/0095993 A1* | 3/2024 | Muthler .................. G06T 15/30 |

OTHER PUBLICATIONS

U.S. Appl. No. 63/428,328, filed Nov. 28, 2022.
Alexander, et al., "Multi-level Ray Tracing Algorithm," ACM Transactions on Graphics, vol. 24, Issue 3, Jul. 2005, pp. 1176-1185.
Hendrich, et al., "Ray Classification for Accelerated BVH Traversal," Eurographics Symposium on Rendering, vol. 38, Issue 4, Jul. 30, 2019, pp. 49-56.
International Search Report and Written Opinion received for PCT Application No. PCT/US23/035850, (MS#412483-PCT01), Feb. 27, 2024, 16 pages.

* cited by examiner

*Primary Examiner* — Frank S Chen
(74) *Attorney, Agent, or Firm* — Workman Nydegger

(57) ABSTRACT

A system for facilitating ray trace operations with shared traversal performs a pre-test operation that includes testing one or more volumes against an acceleration structure associated with a virtual environment to identify a set of candidate nodes of the acceleration structure. The virtual environment comprises one or more virtual objects defined by one or more object components. The system also performs a ray trace operation based upon the set of candidate nodes of the acceleration structure.

19 Claims, 13 Drawing Sheets

RAY TRACING WITH SHARED TRAVERSAL

CROSS-REFERENCE TO RELATED APPLICATIONS

This application claims priority to U.S. Provisional Patent Application Ser. No. 63/428,328, filed Nov. 28, 2022, and entitled "RAY TRACING WITH SHARED TRAVERSAL", the entirety of which is incorporated herein by this reference.

BACKGROUND

Ray tracing is a technique for generating visible imagery reconstructed in a 3D computer graphics environment. In some instances, ray tracing involves tracing a path from a virtual camera or viewing position through each pixel in a virtual image plane. The rays extend into a virtual scene to intersect with virtual content that can be represented by the pixels. Visual properties of the intersected virtual content to be represented by the pixels can then be determined (which can involve determining virtual object/material properties and/or tracing additional rays from the intersected virtual content). Ray tracing can be used to simulate a variety of optical effects, such as reflection, refraction, shadows, scattering, and/or others.

Ray tracing is generally associated with high computational cost and has typically been used in implementations where long rendering times are feasible, such as for generating still computer-generated images or cinematic visual effects. In real-time applications, such as computer graphics for video games or other implementations where rendering speed affects user experience, utilizing ray tracing is associated with many challenges.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
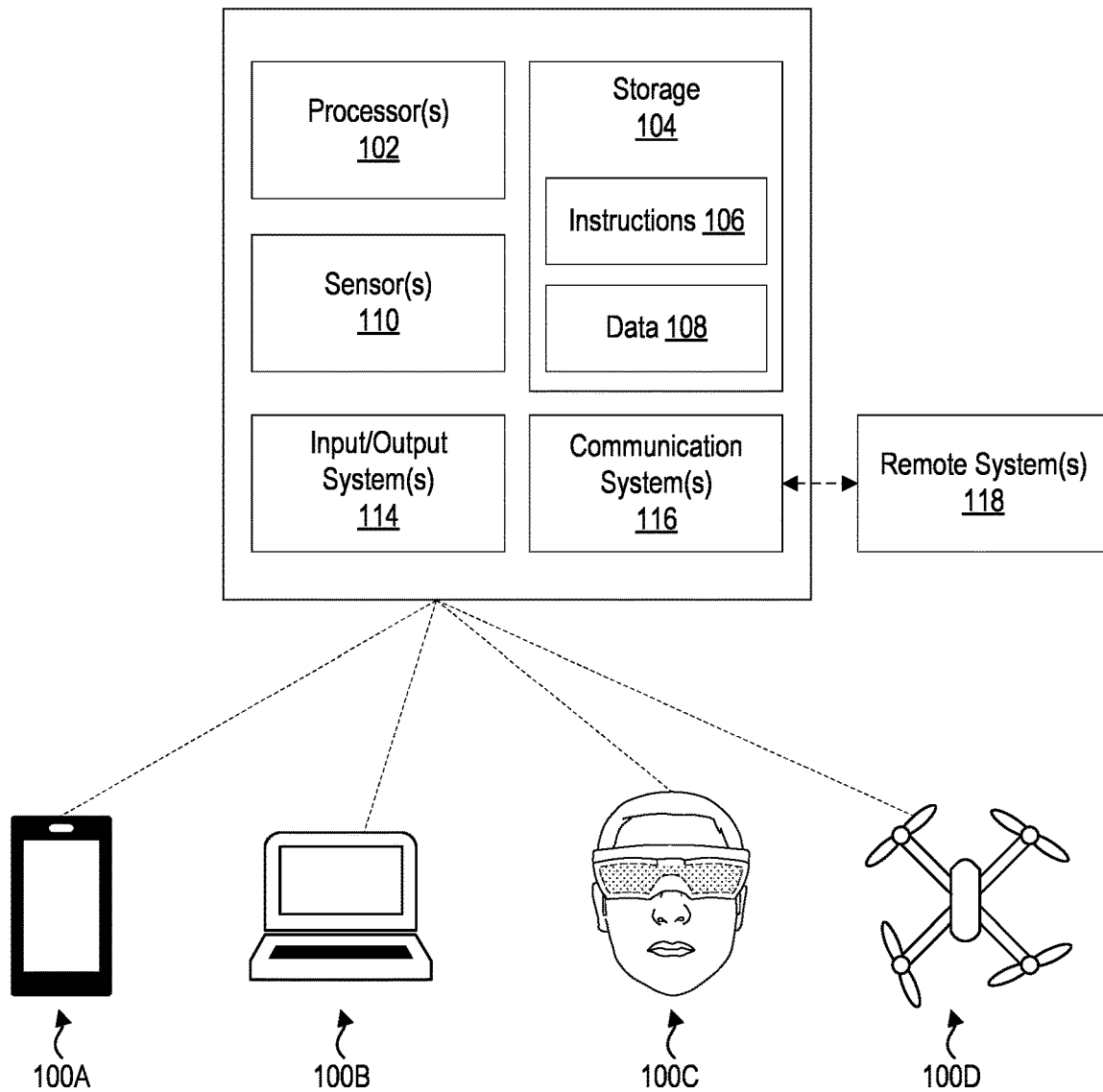
FIG. 1 illustrates example components of an example system that may include or be used to implement one or more disclosed embodiments.

Disclosed embodiments are generally directed to systems, methods, and apparatuses for performing ray trace operations with shared traversal.

As noted above, implementing ray tracing in real-time computer graphics applications is associated with many challenges, in particular because of the computational burden associated with conventional ray tracing techniques. Attempts to adapt ray tracing techniques for real-time applications include utilizing an acceleration structure, which partitions the object components (e.g., mesh triangles, quads, curved surfaces, distance fields, high-level representations, and/or others) of virtual objects in a virtual environment into a structure of nodes. For instance, nodes of an acceleration structure may include either a number of child nodes (e.g., 2, 4, 8, 16, or any number of child nodes) or a set of object components of virtual objects in the virtual environment (e.g., for nodes in the final level of the acceleration structure).

Implementing an acceleration structure can allow systems to refrain from testing whether each ray intersects with every object component within a virtual environment to determine the intersected object component for each ray. Instead, a system may traverse the acceleration structure for each ray by, for each ray, determining which top-level (or starting level) node the ray intersects with, determining which child node of the intersected top-level node the ray intersects with, and so forth (e.g., continuing to test/traverse branches of nodes) until a set of object components is reached in association with an intersected child node in the final level of the acceleration structure. The ray may then be tested against the set of object components to determine which object component the ray intersects with.

Although conventional acceleration structure techniques can facilitate some reduction in the computational cost associated with ray tracing, acceleration structure based ray tracing falls short in many use cases. For example, acceleration structures often encompass significant portions of virtual environments, such as multiple rooms of a building, entire buildings, multiple buildings, or even entire cities. Testing rays against such acceleration structures can result in high latency that degrades user experiences.

At least some embodiments of the present disclosure utilize shared ray traversal in ray trace operations, which may improve computational efficiency in ray tracing. For example, prior to testing individual rays against an acceleration structure associated with a virtual environment (e.g., according to conventional approaches), a system may perform a pre-test operation that involves testing a volume against the acceleration structure. The volume may be associated with multiple rays for which intersection testing against the virtual environment is desired. For instance, the volume may encompass ray starts (e.g., an average origin of the rays), ray stops, and/or likely ray intersections associated with the multiple rays for which intersection testing is desired. By way of example, the volume may comprise at least part of a view frustum volume, a volume associated with a structure within the virtual environment (e.g., a room or building), or a volume extended from a source object within the virtual environment (e.g., a sphere extended from a light source, a sound source, etc.).

In some instances, testing the volume against the acceleration structure enables identification of a set of a set of candidate nodes of the acceleration structure. For example, nodes of the acceleration structure may be traversed (e.g., beginning at the root or top level of the acceleration structure) to determine, for each traversed node of the acceleration structure, whether the volume intersects with or is contained by any child nodes of the traversed node of the acceleration structure. If no child nodes of the traversed node of the acceleration structure intersect with or are contained by the volume, traversal of the child nodes may be avoided. If at least one but fewer than all child nodes of the traversed node of the acceleration structure intersect with or are contained by the volume, the intersected/contained child nodes may be traversed. If all child nodes of the traversed node of the acceleration structure intersect with or are contained by the volume (or if the traversed node includes no child nodes, such as where the traversed node is an instance node), the traversed node may be included in the set of candidate nodes of the acceleration structure. Additional logic, rules, and/or processes may be applied to facilitate selection of a set of candidate nodes from the acceleration structure, as will be described in more detail hereinafter.

The set of candidate nodes of the acceleration structure may be used to facilitate intersection testing for the rays associated with the volume that was pre-tested against the acceleration structure. For instance, the rays may be tested directly against the set of candidate nodes of the acceleration structure (e.g., rather than initially testing the rays against the entire acceleration structure). In some instances, utilizing the set of candidate nodes may allow a system to refrain from testing the rays against the entire acceleration structure (e.g., where the candidate nodes encompass all potential intersections for the tested ray). Such functionality may enable significant reductions in computational cost associated with ray tracing.

In some instances, after testing the rays against the set of candidate nodes, a system may fall back on testing the rays against the remaining nodes of the acceleration structure while refraining from re-testing the nodes within the set of candidate nodes of the acceleration structure.

Having just described some of the various high-level features and benefits associated with the disclosed embodiments, attention will now be directed to FIGS. 1 through 5. These Figures illustrate various conceptual representations, architectures, methods, and supporting illustrations related to the disclosed embodiments.

Example Systems and Components

FIG. 1 illustrates various example components of a system 100 that may be used to implement one or more disclosed embodiments. For example, FIG. 1 illustrates that a system 100 may include processor(s) 102, storage 104, sensor(s) 110, input/output system(s) 114 (I/O system(s) 114), and communication system(s) 116. Although FIG. 1 illustrates a system 100 as including particular components, one will appreciate, in view of the present disclosure, that a system 100 may comprise any number of additional or alternative components.

The processor(s) 102 may comprise one or more sets of electronic circuitry that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions associated with ray tracing. The actions may rely at least in part on data 108 stored on storage 104 in a volatile or non-volatile manner.

In some instances, the actions may rely at least in part on communication system(s) 116 for receiving data from remote system(s) 118, which may include, for example, separate systems or computing devices, sensors, and/or others. The communications system(s) 116 may comprise any combination of software or hardware components that are operable to facilitate communication between on-system components/devices and/or with off-system components/devices. For example, the communications system(s) 116 may comprise ports, buses, or other physical connection apparatuses for communicating with other devices/components. Additionally, or alternatively, the communications system(s) 116 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable or detectable phenomenon. By way of non-limiting example, the sensor(s) 110 may comprise one or more image sensors, microphones, thermometers, barometers, magnetometers, accelerometers, gyroscopes, and/or others.

Furthermore, FIG. 1 illustrates that a system 100 may comprise or be in communication with I/O system(s) 114. I/O system(s) 114 may include any type of input or output device such as, by way of non-limiting example, a touch screen, a mouse, a keyboard, a controller, and/or others, without limitation. For example, the I/O system(s) 114 may include a display system that may comprise any number of display panels, optics, laser scanning display assemblies, and/or other components.

FIG. 1 conceptually represents that the components of the system 100 may comprise or utilize various types of devices, such as mobile electronic device 100A (e.g., a smartphone), personal computing device 100B (e.g., a laptop), a mixed-reality head-mounted display 100C (HMD 100C), an aerial vehicle 100D (e.g., a drone), and/or other devices. A system 100 may take on other forms in accordance with the present disclosure.

Ray Tracing with Shared Traversal

Figure 2A:
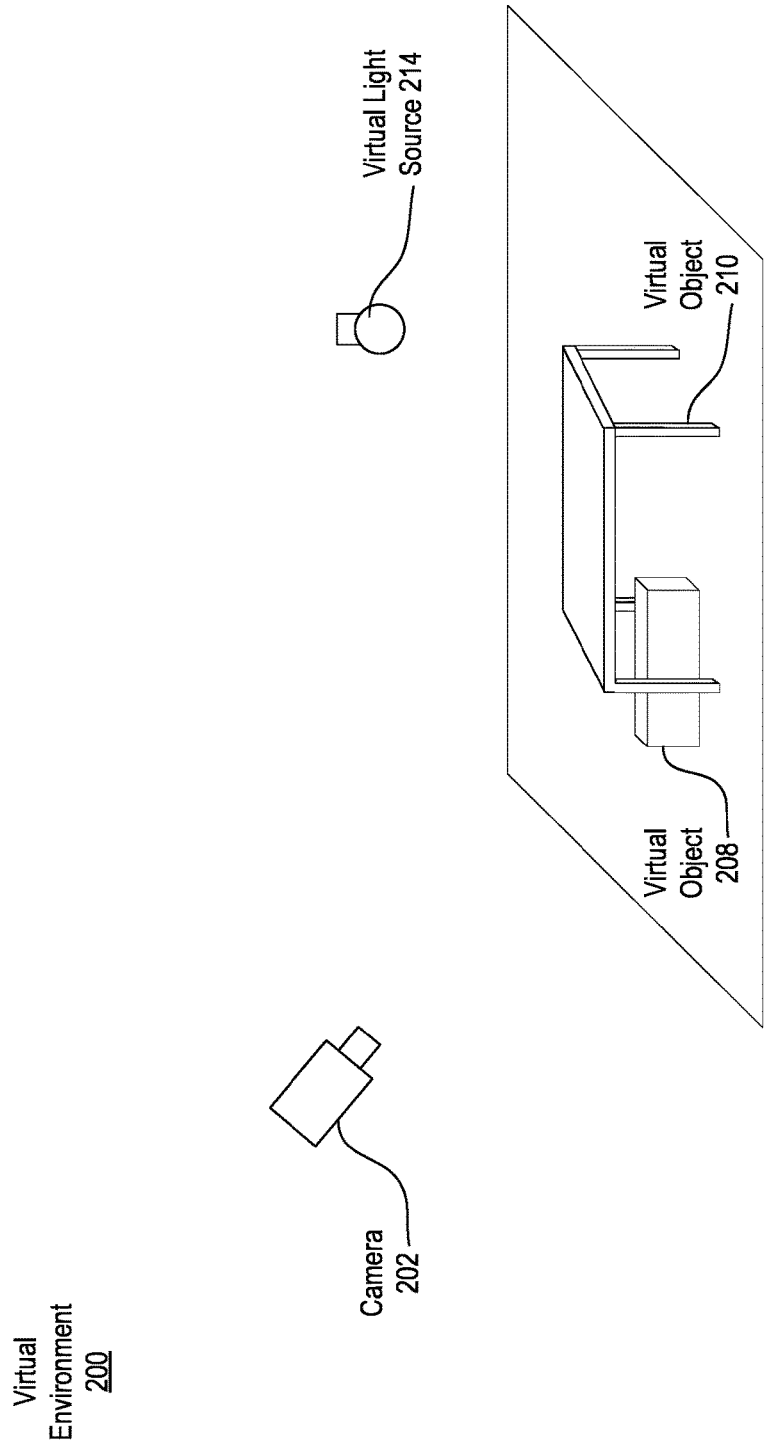
FIG. 2A illustrates a conceptual representation of an example virtual environment.

FIG. 2A illustrates a conceptual representation of an example virtual environment 200 that includes various virtual objects, such as virtual object 208 (e.g., a box), virtual object 210 (e.g., a table), virtual light source 214, etc. The virtual objects within the virtual environment 200 may include or be represented by respective object components, which may take on various forms (e.g., mesh triangles, quads, curved surfaces, distance fields, high-level representations, and/or others). For clarity, the object components are not illustrated in FIG. 2A.

Figure 2B:
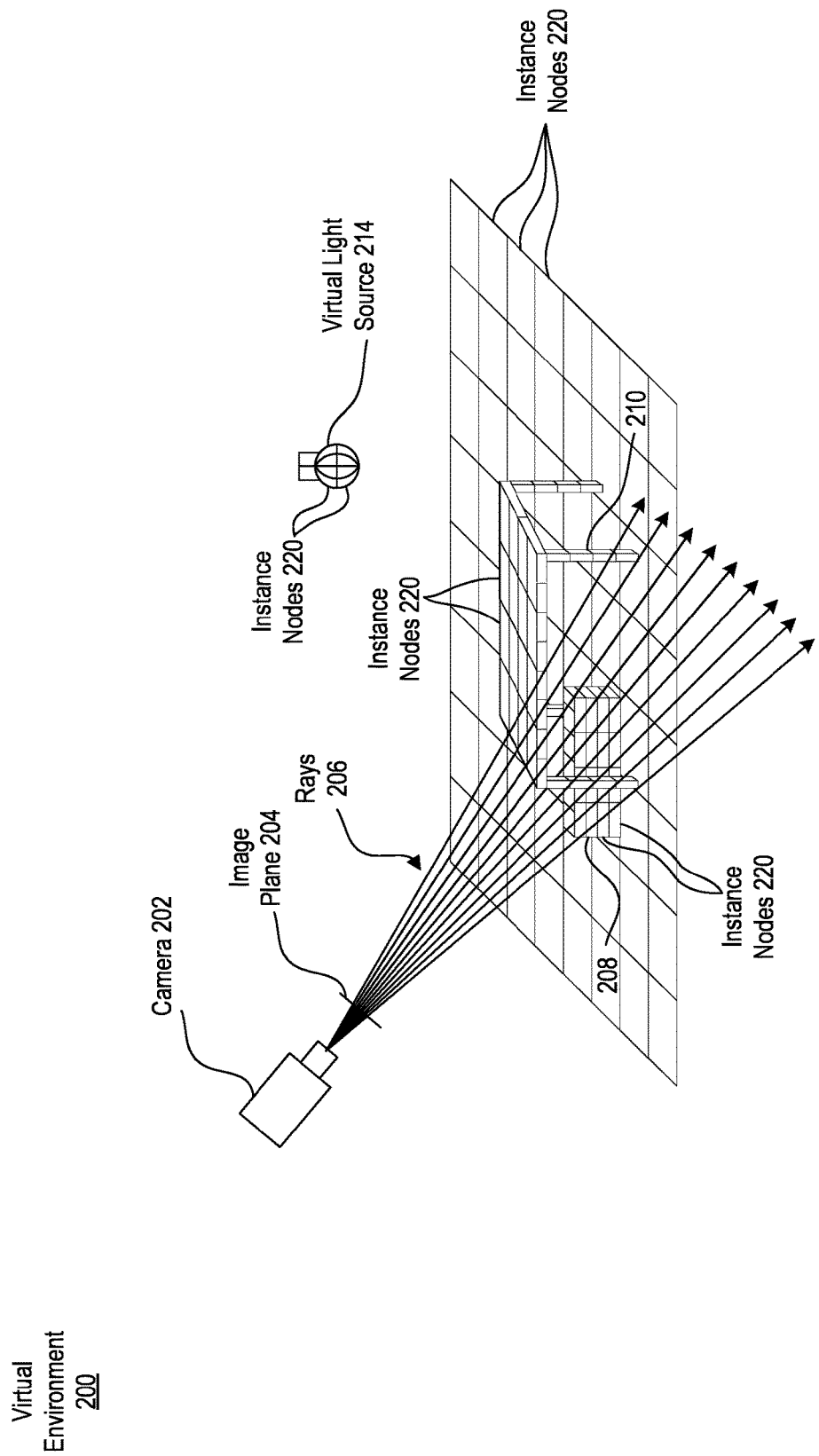
FIG. 2B illustrates a conceptual representation of instance nodes of an acceleration structure associated with the virtual environment and conceptually depicts rays of a ray tracing operation.

FIG. 2A illustrates a camera 202 positioned within the virtual environment 200, which can be associated with a view frustrum associated with a user experience. One or more ray trace operations may be performed to determine portions of the virtual environment 200 that are visible from the perspective of the camera 202. As depicted in FIG. 2B, ray tracing may include tracing rays 206 from an origin point (e.g., the camera 202) through pixels of an image plane 204 and into the virtual environment 200. The pixels of the image plane 204 can correspond to display pixels that will be presented to a user to depict the virtual environment 200 to the user. The rays 206 may thus be used to determine what portions of the virtual environment 200 to display on corresponding display pixels (e.g., on a frame-by-frame basis).

As discussed hereinabove, under conventional ray tracing techniques, each of the rays 206 may be individually tested against an acceleration structure that partitions the virtual environment 200 via a multi-level hierarchy of nodes, child nodes, etc. Each of the rays 206 may be tested against the acceleration structure via node traversal until an instance node is reached (e.g., at a bottom level of the acceleration structure). In some implementations, instance nodes of an acceleration structure contain object components of objects within the virtual environment with which the acceleration structure is associated. The ray may then be tested against the object components contained by the instance node to determine the object component with which the ray intersects.

FIG. 2B depicts instance nodes 220 of an acceleration structure for the virtual environment 200. The instance nodes 220 of the acceleration structure of the virtual environment 200 may comprise child nodes of higher-level nodes of the acceleration structure (which are not illustrated in FIG. 2B). The instance nodes 220 of FIG. 2B permit re-use of object components (e.g., triangles, not shown) of the virtual objects at different locations within the virtual environment 200. Each of the rays 206 may be individually tested against higher-level nodes of the acceleration structure (e.g., beginning with a top level) of the virtual environment 200 via node traversal to determine whether the ray intersects with one of the instance nodes 220. If a ray 206 is determined to intersect with an instance node 220, the ray 206 may then be tested against the object components contained by the instance node 220 to determine an intersected object component for the ray 206. A display pixel corresponding to the pixel on the image plane 204 through which the ray 206 was traced may then be configured/controlled to depict/represent the intersected object component (e.g., for a particular frame). Properties of the intersected object component may be accessed and/or determined (which may include additional ray trace operations) to facilitate realistic representation of the intersected object component with the corresponding display pixel.

As noted above, conventional ray tracing techniques are associated with computational inefficiency. Intuitively, the rays 206, when individually tested against the overarching acceleration structure associated with the virtual environment 200, traverse nodes (especially high-level nodes) of the acceleration structure in a similar path until reaching a level (of sufficient granularity) where the node traversal paths of different rays diverge. For instance, if the acceleration structure associated with the virtual environment 200 encompasses virtual objects/spaces not shown in FIG. 2B (e.g., other rooms, other buildings, an entire city, etc.), rays 206 tested against the acceleration structure would share a common node traversal path (beginning at the top level) until a level in the acceleration structure is reached where the virtual objects of the virtual environment 200 shown in FIG. 2B are encompassed by more than one node.

As will be described hereinbelow, pre-testing a volume associated with a set of rays against the acceleration structure of a virtual environment may enable a system to circumvent testing of multiple rays along a shared node traversal path. A set of candidate nodes (e.g., starting nodes or shortcut nodes) may be identified via the testing of the volume against the acceleration structure. The candidate nodes may provide a starting point for intersection testing of individual rays of the set of rays that is associated with the volume (e.g., rather than starting intersection testing of each individual ray at the top level of the acceleration structure). Such functionality may significantly reduce the computational burden associated with ray tracing in virtual environments.

Figure 2C:
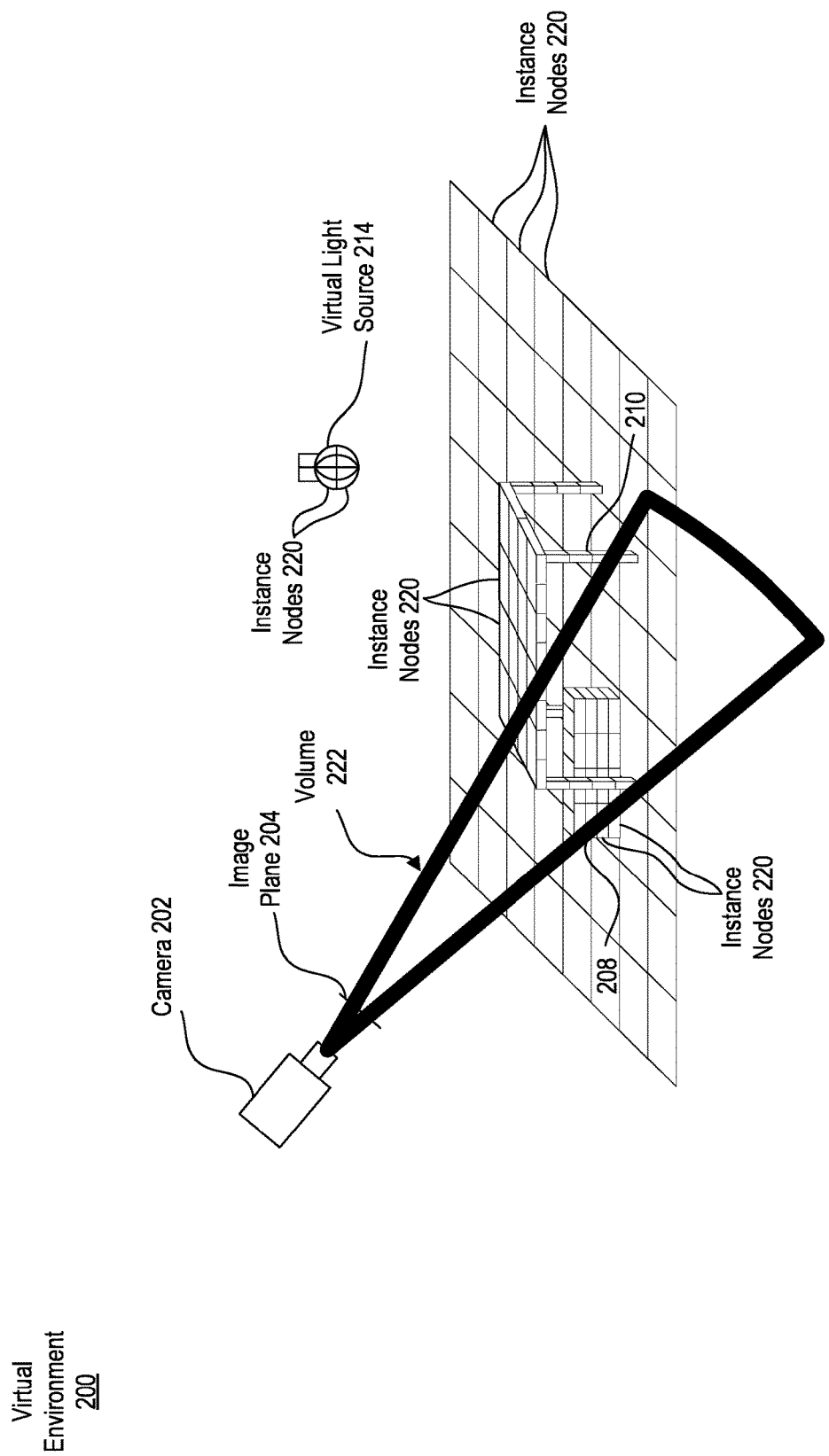
FIG. 2C illustrates a conceptual representation of a volume associated with the rays of the ray tracing operation.

FIG. 2C illustrates a conceptual representation of a volume 222 associated with the rays of 206 of FIG. 2B for which ray intersection testing is desired. In the example of FIG. 2C, the volume 222 comprises a view frustrum volume that extends for the length of the rays 206 of FIG. 2B. Other volumes (e.g., at least partially encompassing ray starts, ray stops, and/or likely ray intersections for a set of rays) may be utilized in accordance with the principles described herein (e.g., see FIGS. 4A through 4C). In some implementations, rather than initially testing individual rays 206 against the acceleration structure of the virtual environment 200, a system tests the volume 222 against the acceleration structure. As noted above, testing of the volume 222 against the acceleration structure can facilitate identification of a set of candidate nodes of the acceleration structure (which may be at any level within the acceleration structure). The candidate nodes may be utilized as starting points for intersection testing of individual rays associated with the volume 222 (e.g., rays 206 from FIG. 2B).

Figure 3A:
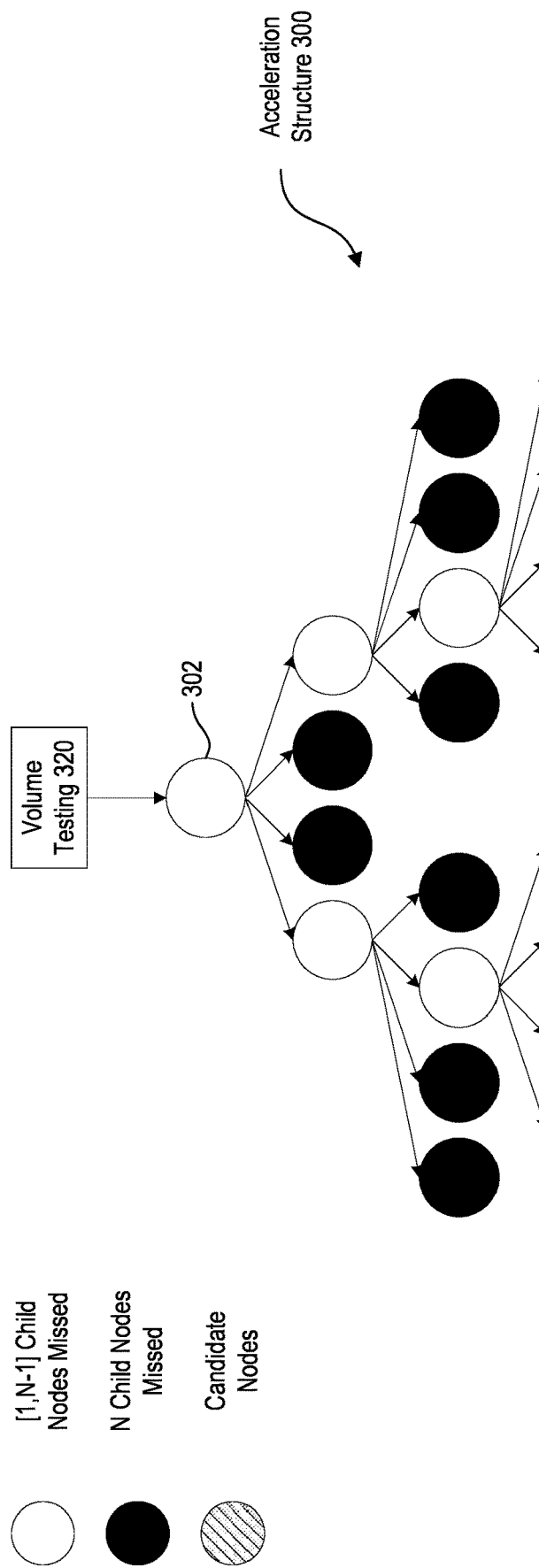
FIG. 3A illustrates a conceptual representation of testing a volume against an acceleration structure to determine a set of candidate nodes.

FIG. 3A illustrates a conceptual representation of a pretest operation that includes testing a volume against an acceleration structure to determine a set of candidate nodes. In particular, FIG. 3A depicts part of an acceleration structure 300, with nodes of the acceleration structure depicted as circles. The acceleration structure 300 of FIG. 3A comprises a quadtree structure where each node comprises four child nodes. Other node configurations are within the scope of the present disclosure (e.g., with each node of the acceleration structure including 2, 8, 16, 32 or any quantity of child nodes)

In the example of FIG. 3A, the node 302 comprises the top-level (or root) node of the acceleration structure. The four child nodes of node 302 (indicated by arrows extending from node 302) partition a virtual environment into four quadrants. The child nodes of each child node of node 302 further partition the virtual environment into four sub-quadrants, and so forth (until the child nodes comprise instance nodes, which contain object components of the virtual environment). FIG. 3A conceptually depicts volume testing 320, in which a volume (e.g., volume 222 of FIG. 2C) is tested against the acceleration structure 300 (e.g., beginning with node 302). In the example of FIG. 3A, volume testing 320 includes traversing the nodes of the acceleration structure 300 to determine, for each traversed node of the acceleration structure 300, whether the tested volume intersects with or contains any child nodes of the traversed node of the acceleration structure 300.

For instance, volume testing 320 of node 302 includes determining whether the tested volume intersects with or is contained by the child nodes of node 302. Whether the tested volume intersects with or is contained by a child node of a traversed node can influence the continuation of the node traversal path of the volume testing 320 and the determination of the candidate nodes that can be used to test individual rays associated with the tested volume.

For instance, if at least one but fewer than all child nodes of a traversed node of the acceleration structure 300 intersect with or are contained by a tested volume, a system may proceed to traverse (i.e., test the volume against) the intersected/contained child node(s) of the traversed node of the acceleration structure 300. FIG. 3A depicts traversed nodes of the acceleration structure 300 where at least one but fewer than all child nodes intersect with or are contained by the tested volume as solid white circles (labeled as nodes for which a range of [1, N−1] child nodes are missed by the tested volume, where N is the number of child nodes in a non-leaf node of the acceleration structure 300). Furthermore, if no child nodes of a traversed node of the acceleration structure 300 intersect with or are contained by the tested volume, a system may refrain from traversing (i.e., testing the volume against) the child nodes of the traversed node of the acceleration structure 300. FIG. 3A depicts traversed nodes of the acceleration structure 300 where no child nodes intersect with or are contained by the test volume as solid black circles (labeled as nodes for which N child nodes are missed by the tested volume).

In some instances, a system may include traversed nodes of the acceleration structure 300 that have at least one of the following characteristics in the set of candidate nodes: (i) all child nodes of the traversed node intersect with or are contained by the tested volume or (ii) the traversed node is a leaf node with no child nodes of its own. As will be discussed in more detail hereinafter, in some implementations, a set of candidate nodes may include nodes for which more than one but not all child nodes intersect with or are contained by the tested volume, such as where a practical limitation exists on the number of candidate nodes. FIG. 3A depicts candidate nodes of the acceleration structure 300 as circles with a diagonal line pattern fill (labeled as candidate nodes). In some instances, a system orders the candidate nodes of the acceleration structure based upon one or more importance factors. Importance factors may include, by way of non-limiting example, node level within the acceleration structure 300, node proximity (or proximity of object components contained by the node) to a ray origin (e.g., an average ray origin, camera position, etc. of rays associated with the tested volume). As discussed below, the candidate nodes may be used for ray testing in accordance with the ordering of the candidate nodes.

Figure 3B:
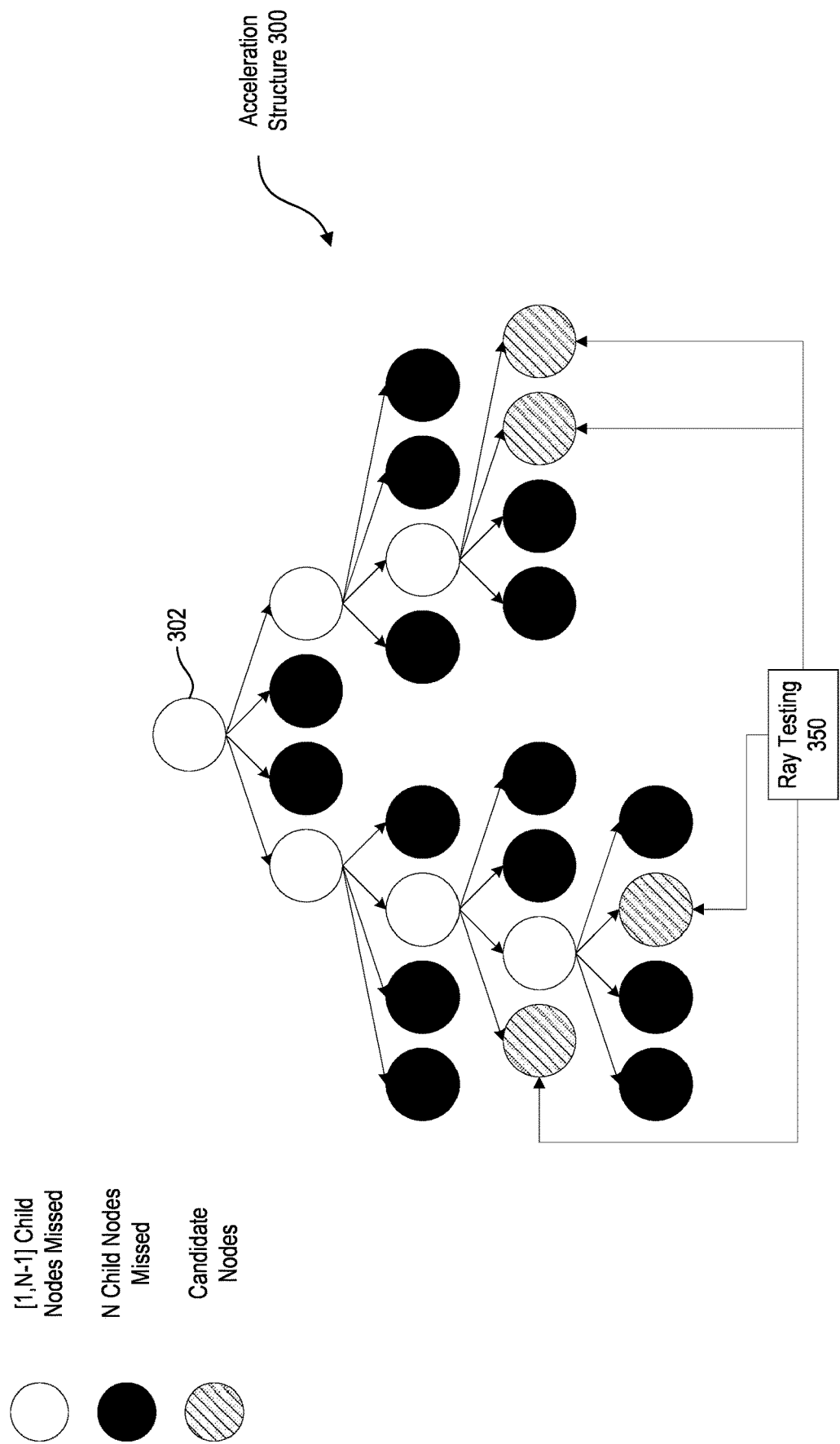
FIG. 3B illustrates a conceptual representation of testing rays associated with the volume against the set of candidate nodes.

As noted hereinabove, the set of candidate nodes of the acceleration structure 300 may be utilized in ray tracing of rays associated with the volume of the volume testing 320 for determining the set of candidate nodes. FIG. 3B conceptually depicts ray testing 350 for rays associated with the volume of the volume testing 320 of FIG. 3A. The ray testing 350 includes testing the rays against (at least some of) the set of candidate nodes (determined via the volume testing 320 of FIG. 3A) to determine one or more intersected object components for the tested rays. The ray testing 350 may begin, for each ray, at one of the candidate nodes of the acceleration structure 300 and proceed with (child) node traversal until an instance node is reached. If an instance node is reached, the ray may be tested against the object components contained by the instance node. If no instance node is reached, ray testing may continue at another candidate node of the acceleration structure 300, and so forth. Where the candidate nodes of the acceleration structure 300 are ordered (e.g., according to an importance factor, as discussed above), the ray testing 350 may begin and proceed in accordance with the ordering.

As shown in FIG. 3B, by performing ray testing 350 using the candidate nodes, a system may advantageously circumvent testing individual rays against nodes of the acceleration structure 300 between node 302 and the candidate nodes, which can result in improved ray tracing computational efficiency. In some instances, such as where at least one candidate node substantially encompasses a region that includes the tested volume and/or the rays associated therewith, a system may refrain from testing the remaining (non-candidate) nodes of the acceleration structure 300, even when the system determines that a ray intersects with no object components contained by the set of candidate nodes.

In the example of FIGS. 3A and 3B, the volume testing 320 resulted in a set of four candidate nodes. However, a set of candidate nodes may include any number of candidate nodes in accordance with the present disclosure. Furthermore, in some implementations, practical limitations will exist on the number of candidate nodes that a system may utilize for ray testing (e.g., based upon hardware constraints). In such implementations, a system may account for such practical limitations by restricting and/or modifying the quantity of nodes within a set of candidate nodes.

By way of illustrative example, the candidate nodes of the acceleration structure 300 of FIG. 3A may be initially identified via volume testing 320. The identified candidate nodes may be regarded as an initial set of nodes of the acceleration structure 300. The quantity of nodes in the initial set of nodes may be compared to a node quantity parameter associated with the system tasked with performing the volume testing 320 and ray testing 350. In some instances, the node quantity parameter is based upon hardware and/or computational limitations of the system. If the quantity of nodes in the initial set of nodes is equal to or less than the node quantity parameter, then the initial set of nodes may be defined as the set of candidate nodes (which may be used for ray testing 350). If the quantity of nodes in the initial set of nodes is greater than the node quantity parameter, the system may determine a modified set of nodes for use as the set of candidate nodes.

Figure 3C:
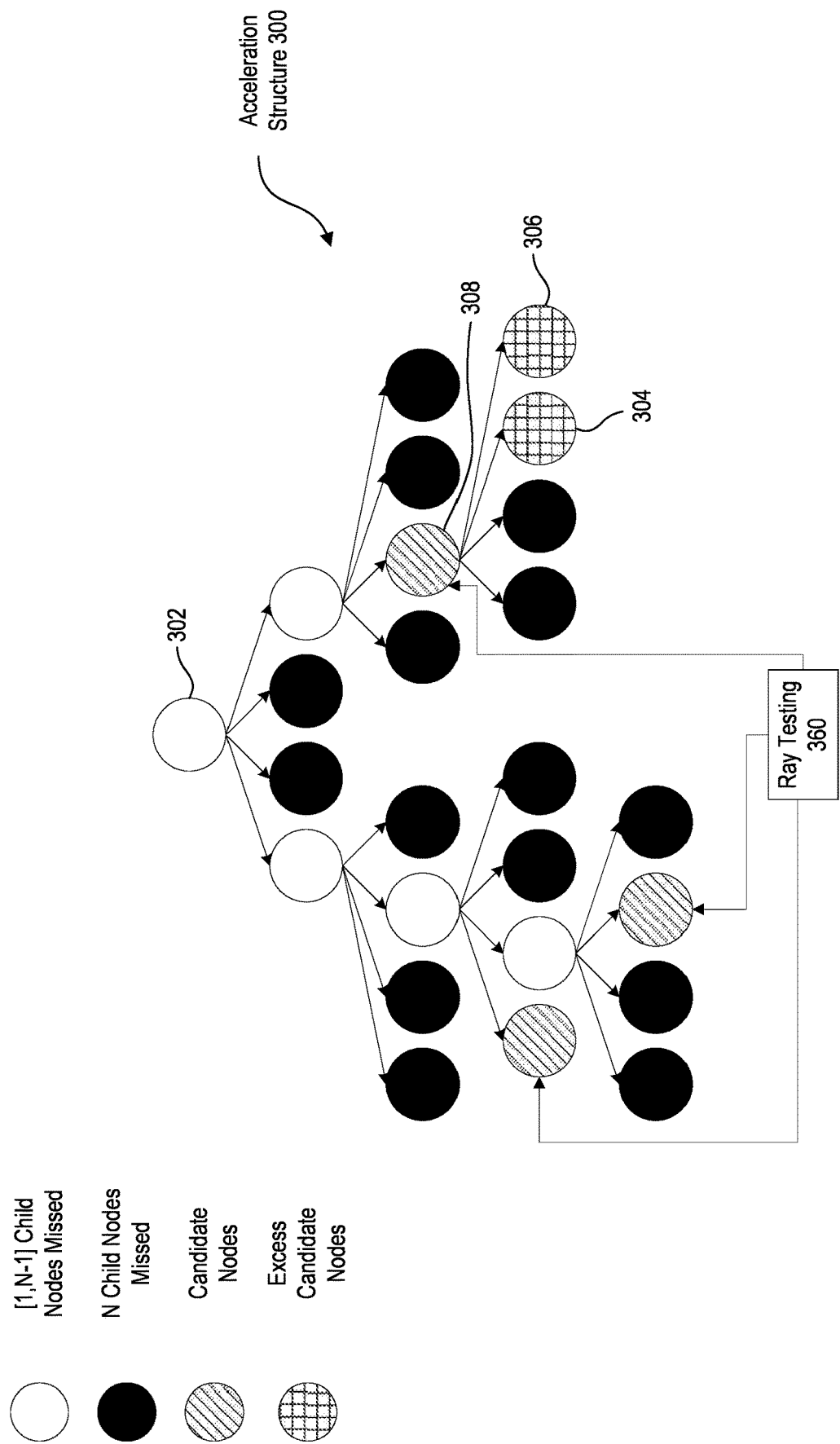
FIGS. 3C through 3E illustrate conceptual representations of testing rays associated with the volume against alternative sets of candidate nodes.

For instance, continuing with the example of FIGS. 3A, the initial set of nodes includes four nodes, and an example node quantity parameter may be set to three nodes. Because the quantity of nodes in the initial set of nodes exceeds the node quantity parameter, a system may modify the initial set of nodes to obtain a set of candidate nodes that satisfies the node quantity parameter. FIG. 3C illustrates the acceleration structure 300 of FIG. 3A where a system has modified the initial set of nodes (i.e., the candidate nodes as defined in FIG. 3A) to obtain a modified set of nodes (i.e., the candidate nodes as defined in FIG. 3C). In the example of FIG. 3C, a system replaced two nodes of the initial set of nodes (i.e., nodes 304 and 306) with a higher-level node (i.e., node 308) that encompasses the two replaced nodes. One will appreciate, in view of the present disclosure, that any number of nodes in an initial set of nodes may be replaced by a single node to form a modified set of candidate nodes (e.g., to achieve accordance with a node quantity parameter). FIG. 3C conceptually depicts ray testing 360 using the modified set of candidate nodes depicted in FIG. 3C.

Figure 3D:
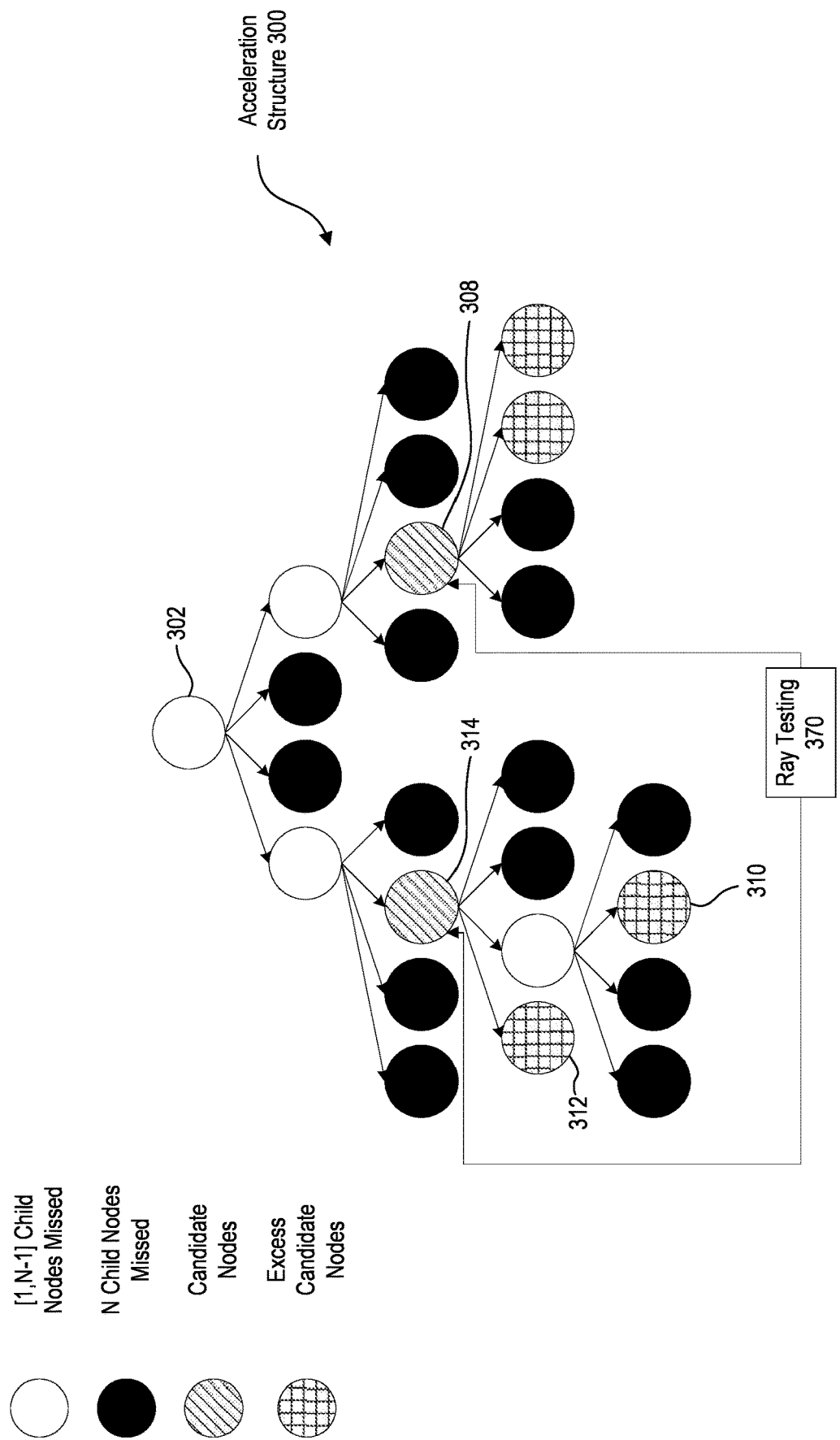

FIG. 3D provides another example of modifying an initial set of nodes to satisfy a node quantity parameter of two nodes, where nodes 310 and 312 of the initial set of nodes (i.e., the candidate nodes defined in FIG. 3A) are replaced by a higher-level node (i.e., node 314) to provide a modified set of candidate nodes for use in ray testing 370.

Figure 3E:
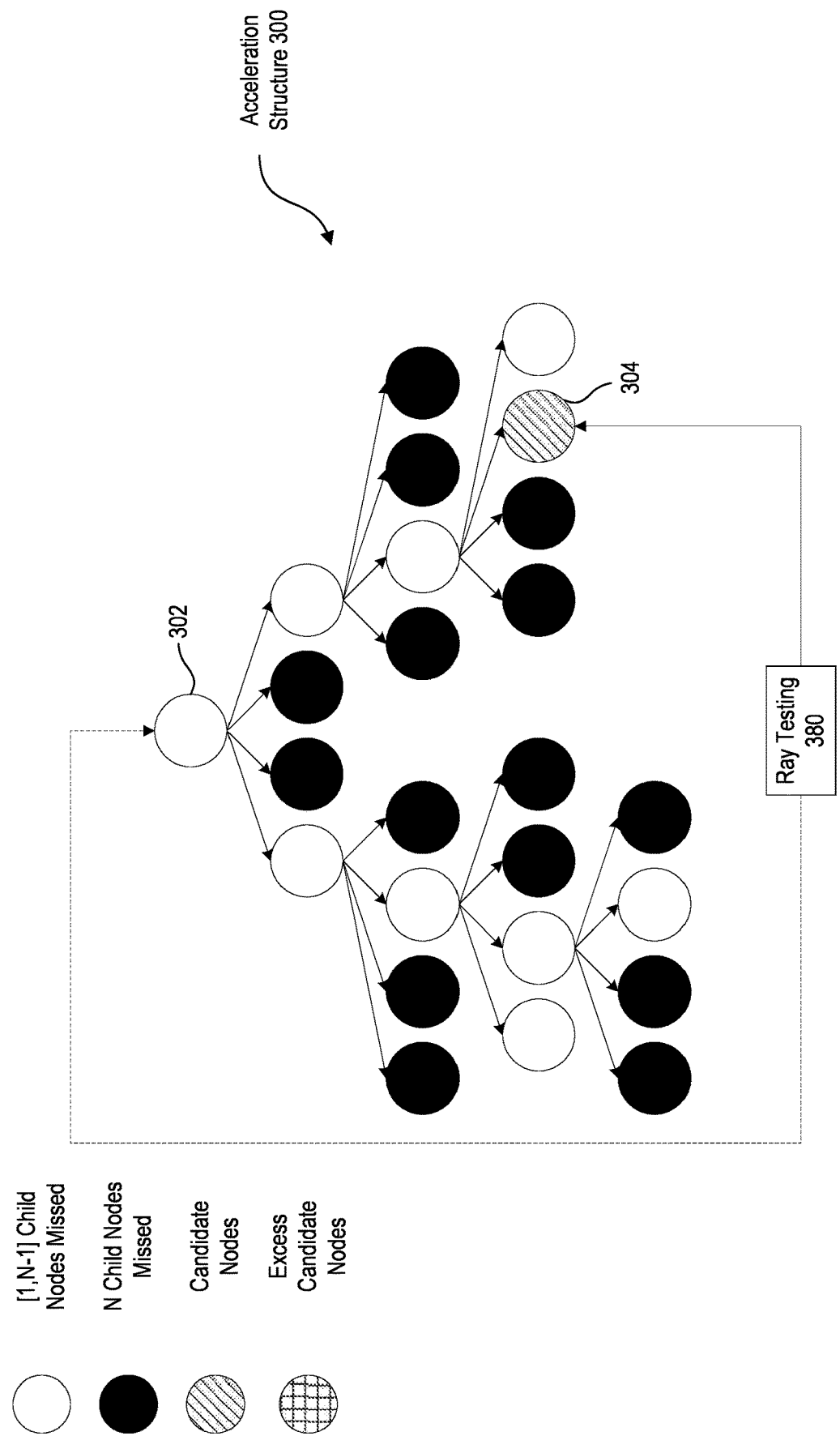

In some implementations, rather than retroactively modifying an initial set of nodes based upon a node quantity parameter as discussed with reference to FIGS. 3C and 3D, a system may be configured to selectively stop traversal of nodes of the acceleration structure when a quantity of nodes in the set of candidate nodes satisfies the node quantity parameter (e.g., when the quantity of nodes with all children intersecting with or being contained by the tested volume meets the node quantity parameter). FIG. 3E illustrates an example in which node 304 is the only candidate node in a set of candidate nodes limited by a node quantity parameter of one, resulting from stoppage of node traversal during volume testing based upon the number of candidate nodes satisfying the node quantity parameter.

As depicted in FIG. 3E, ray testing 380 may be performed utilizing the set of candidate nodes (including node 304). FIG. 3E also illustrates a dashed arrow extending from the ray testing 380 toward node 302 (i.e., the top-level node of the acceleration structure 300), indicating that, in some instances, ray testing may include test other nodes (e.g., remaining nodes) of the acceleration structure 300 (e.g., beginning with a top-level node) that are not included in a set of candidate nodes (e.g., where the set of candidate nodes fails to substantially encompass a region that includes the tested volume used to determine the set of candidate nodes). In some instances, when testing a ray against remaining nodes of an acceleration structure 300 after testing the ray against a set of candidate nodes of the acceleration structure 300, a system may refrain from retesting nodes in the set of candidate nodes of the acceleration structure 300.

Although FIGS. 3C through 3E generally discuss modifying and/or limiting a set of candidate nodes of an acceleration structure 300 based upon a node quantity parameter, one will appreciate, in view of the present disclosure, that nodes of a set of candidate nodes of an acceleration structure 300 may be selectively modified for other reasons. By way of non-limiting example, a system may replace at least one node of the set of candidate nodes with a higher-level node where the higher-level node. In some instances, the higher-level node is selected to substantially encompass a region that includes the volume tested to identify the set of candidate nodes. In some instances, the higher-level node is selected to encompass a structure within a virtual environment (e.g., a structure that encompasses the tested volume, such as a room, building, vehicle, etc.). In some instances, the higher-level node is selected to substantially encompass a volume determined based upon a range of perception (e.g., a range of vision, a range of hearing) associated with a virtual environment. In some instances, the higher-level node is a top-level node of the acceleration structure.

Figure 4A:
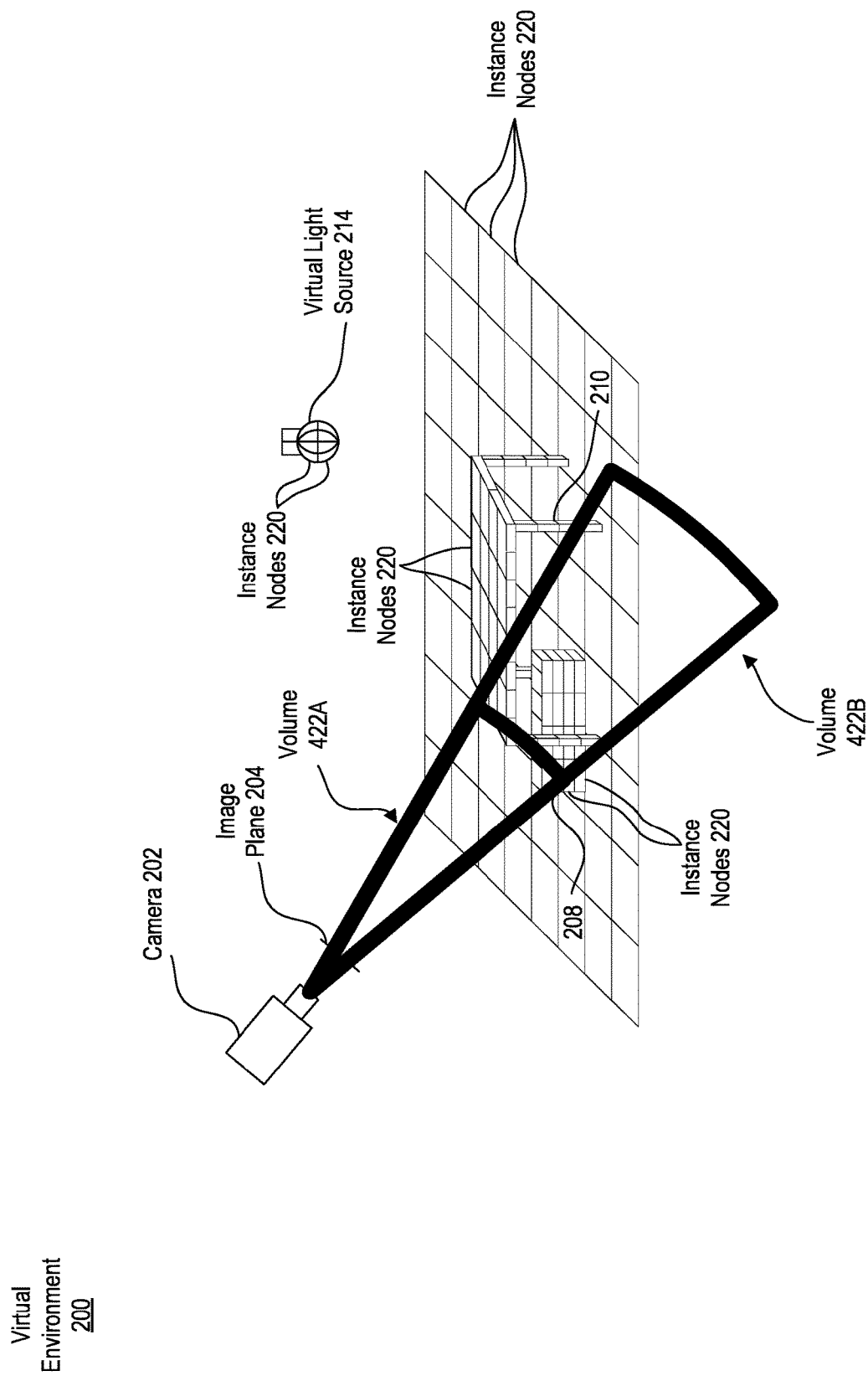
FIGS. 4A through 4C illustrate conceptual representations of volumes that may be tested against an acceleration structure to determine candidate nodes.

Although the foregoing examples have focused, in at least some respects, on a single volume associated with a view frustum, the principles described herein may be applied when multiple volumes are associated with the same view frustum (as well as in other contexts). For instance, FIG. 4A illustrates a first volume 422A associated with a near region of the view frustum associated with the camera 202 within the virtual environment 200 and a second volume 422B associated with a far region of the view frustum associated with the camera 202. The different volumes 422A and 422B may be associated with different sets of rays (or different portions of the same set of rays). In some instances, the different volumes 422A and 422B are separately tested against the acceleration structure associated with the virtual environment 200 to obtain respective sets of candidate nodes (or respective subsets of candidate nodes). The respective sets (or subsets) of candidate nodes may be used to facilitate intersection testing of the respective sets of rays associated with the different volumes 422A and 422B.

Figure 4B:
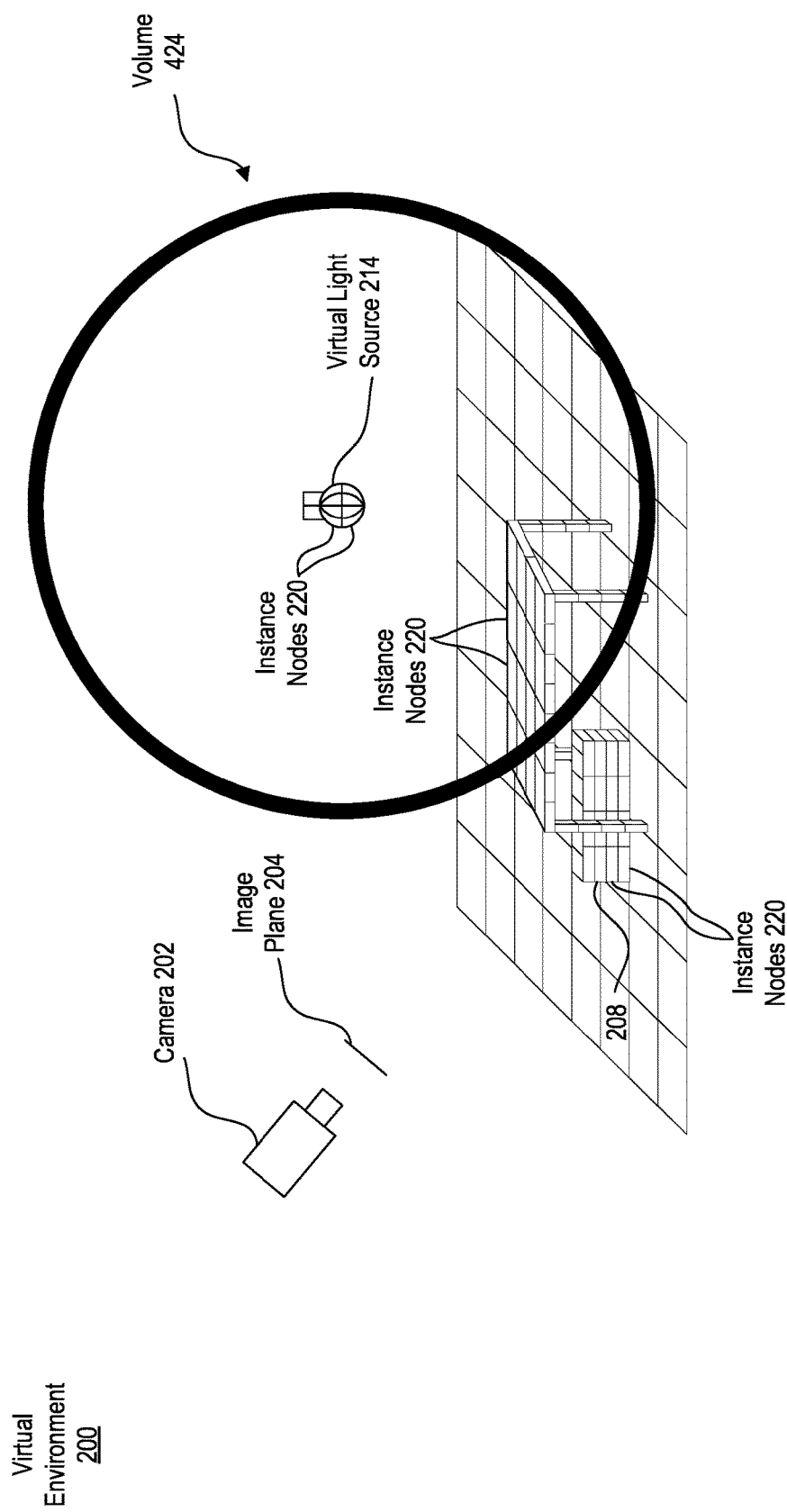
Figure 4C:
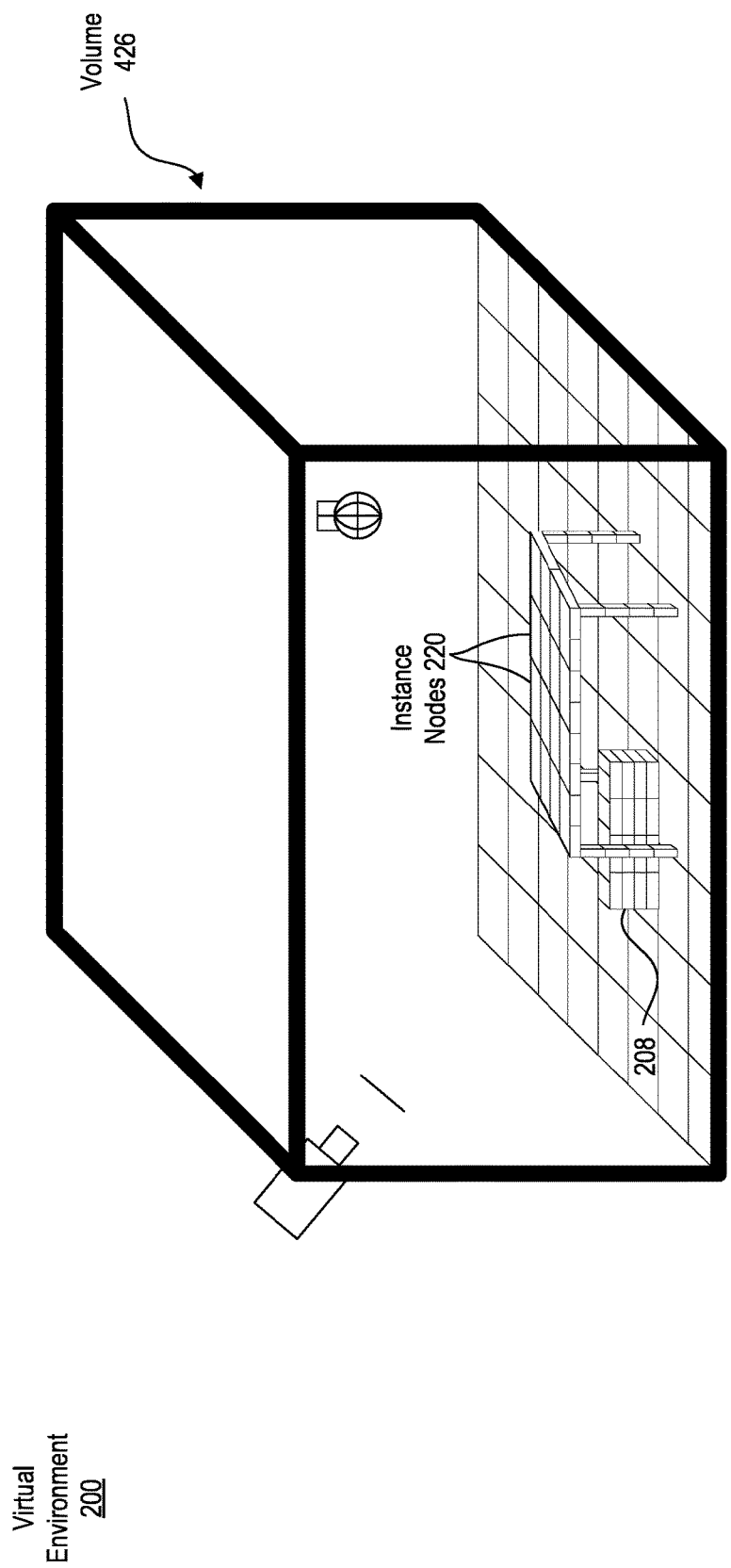

One will appreciate, in view of the present disclosure, that other volumes aside from those associated with view frusta may be utilized for pre-test operations to determine candidate nodes for ray intersection testing. For instance, FIG. 4B illustrates an example volume 424 extended from the virtual light source 214 within the virtual environment 200. Such a volume may be utilized to identify candidate nodes for ray intersection testing associated with determining shadow effects, reflection effects, and/or other visual characteristics of objects within the virtual environment 200. Volumes associated with other source objects (e.g., sound sources) may be utilized in accordance with the principles described herein (e.g., to identify candidate nodes for determining acoustic effects via ray tracing). FIG. 4C illustrates an example volume 426 associated with the structure that includes the virtual objects of the virtual environment 200 described herein. Volumes associated with other structures and/or structural partitions may be utilized for volume pre-testing within the scope of the present disclosure. Other types of volumes not explicitly illustrated herein may be additionally or alternatively be utilized to determine candidate nodes for ray intersection testing (e.g., a volume associated with a range of visual, aural, and/or other perception).

Example Method(s)

The following discussion now refers to a number of methods and method acts that may be performed in accordance with the present disclosure. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 5:
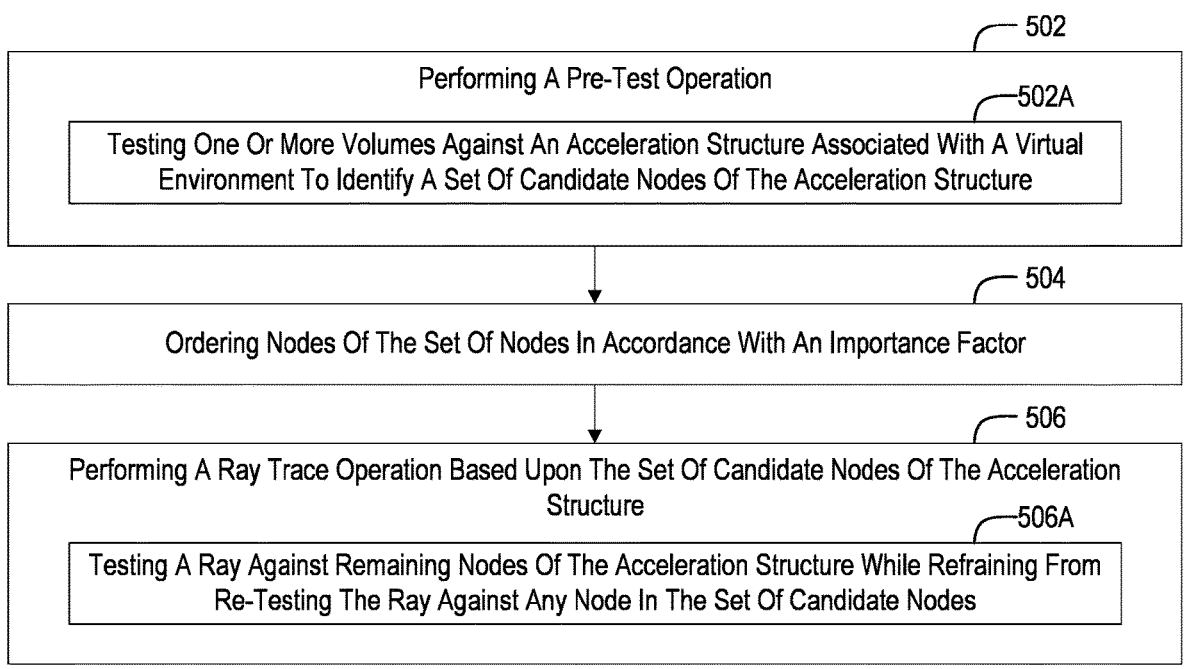
FIG. 5 illustrates an example flow diagram depicting acts associated with ray tracing with shared traversal.

FIG. 5 illustrates an example flow diagram 500 depicting acts associated with ray tracing with shared traversal.

Act 502 of flow diagram 500 of FIG. 5 includes performing a pre-test operation. Act 502A of the pre-test operation of act 502 includes testing one or more volumes against an acceleration structure associated with a virtual environment to identify a set of candidate nodes of the acceleration structure. In some instances, the virtual environment comprises one or more virtual objects defined by one or more object components.

The one or more volumes may comprise one or more view frustum volumes. In some instances, the one or more view frustum volumes comprise a view frustum volume that extends for a length of one or more rays associated with the ray trace operation. In some instances, the one or more view frustum volumes comprise a plurality of view frustum volumes, where each of the plurality of view frustum volumes is associated with a respective set of rays of a ray trace operation to be performed. The set of candidate nodes may comprise a respective subset of candidate nodes for each view frustum volume of the plurality of view frustum volumes.

The one or more volumes may comprise a volume extended from a source object within the virtual environment (e.g., a light source). In some instances, the one or more volumes comprise a volume associated with a range of perception. In some implementations, the one or more volumes comprise a volume associated with a structure within the virtual environment.

In some instances, testing the one or more volumes against the acceleration structure begins at a top level of the acceleration structure. Testing the one or more volumes against the acceleration structure may comprise traversing nodes of the acceleration structure by determining, for each traversed node of the acceleration structure, whether the one or more volumes intersect with or are contained by any child nodes of the traversed node of the acceleration structure. In some implementations, testing the one or more volumes against the acceleration structure comprises, for each traversed node of the acceleration structure: (i) in response to determining that no child nodes of the traversed node intersect with or are contained by the one or more volumes, refraining from traversing child nodes of the traversed node; (ii) in response to determining that at least one but fewer than all child nodes of the traversed node intersect with or are contained by the one or more volumes, traversing the at least one but fewer than all child nodes of the traversed node; and (iii) in response to determining that all child nodes of the traversed node intersect with or are contained by the one or more volumes, or in response to determining that the traversed node includes no child nodes, including the traversed node in the set of candidate nodes.

In some implementations, testing the one or more volumes against the acceleration structure comprises stopping traversal of nodes of the acceleration structure when a quantity of nodes in the set of candidate nodes satisfies a node quantity parameter.

In some instances, identifying the set of candidate nodes comprises: (i) identifying an initial set of nodes of the acceleration structure by testing the one or more volumes against the acceleration structure; (ii) comparing a quantity of nodes in initial set of nodes to a node quantity parameter; (iii) in response to determining that the quantity of nodes in the initial set of nodes is equal to or less than the node quantity parameter, defining the initial set of candidate nodes as the set of candidate nodes; and (iv) in response to determining that the quantity of nodes in initial set of nodes is greater than the node quantity parameter: (a) modifying the initial set of nodes to obtain a modified set of nodes by replacing at least two nodes of the initial set of nodes with a higher-level node that encompasses the at least two nodes; and (b) defining the modified set of nodes as the set of candidate nodes.

In some instances, identifying the set of candidate nodes comprises: (i) identifying an initial set of nodes of the acceleration structure by testing the one or more volumes against the acceleration structure; (ii) obtaining a modified set of nodes by replacing at least one node of the initial set of nodes with a higher-level node; and (iii) defining the modified set of nodes as the set of candidate nodes. In some instances, the higher-level node is selected to substantially encompass the one or more volumes. In some instances, the higher-level node is selected to substantially encompass a structure within the virtual environment that encompasses the one or more volumes. In some instances, the higher-level node is selected to substantially encompass a second volume determined based upon a range of perception associated with the virtual environment. In some instances, the higher-level node comprises a top-level node of the acceleration structure.

Act 504 of flow diagram 500 includes ordering nodes of the set of nodes in accordance with an importance factor. In some instances, the importance factor comprises proximity to an average ray origin or camera position associated with the ray trace operation. In some instances, the importance factor comprises node level within the acceleration structure.

Act 506 of flow diagram 500 includes performing a ray trace operation based upon the set of candidate nodes of the acceleration structure. In some implementations, performing the ray trace operation based upon the set of candidate nodes comprises testing one or more rays against one or more nodes of the set of candidate nodes to determine one or more intersected object components of the one or more object components of the virtual environment. In some instances, performing the ray trace operation comprises testing the one or more rays against the one or more nodes of the set of candidate nodes in accordance with the ordering of the nodes of the set of nodes (e.g., the ordering of act 504). Performing the ray trace operation may comprise refraining from testing the ray against remaining nodes of the acceleration structure not included in the set of candidate nodes. In some instances, act 506 includes 506A, which comprises testing a ray against remaining nodes of the acceleration structure while refraining from re-testing the ray against any node in the set of candidate nodes.

Additional Details Related to Computing Systems

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope

I claim:

1. A system for facilitating ray trace operations with shared traversal, comprising:
 one or more processors; and
 one or more hardware storage devices that store instructions that are executable by the one or more processors to configure the system to:
  perform a pre-test operation, the pre-test operation comprising:
   testing one or more volumes against an acceleration structure associated with a virtual environment to identify a set of candidate nodes of the acceleration structure, the virtual environment comprising one or more virtual objects defined by one or more object components, wherein testing the one or more volumes against the acceleration structure comprises, for each traversed node of the acceleration structure:

after determining that no child nodes of the traversed node intersect with or are contained by the one or more volumes, refraining from traversing child nodes of the traversed node;

after determining that at least one but fewer than all child nodes of the traversed node intersect with or are contained by the one or more volumes, traversing the at least one but fewer than all child nodes of the traversed node; and after determining that all child nodes of the traversed node intersect with or are contained by the one or more volumes, or after determining that the traversed node includes no child nodes, including the traversed node in the set of candidate nodes; and perform a ray trace operation based upon the set of candidate nodes of the acceleration structure.

2. The system of claim 1, wherein testing the one or more volumes against the acceleration structure comprises traversing nodes of the acceleration structure by determining, for each traversed node of the acceleration structure, whether the one or more volumes intersect with or are contained by any child nodes of the traversed node of the acceleration structure.

3. The system of claim 2, wherein testing the one or more volumes against the acceleration structure comprises stopping traversal of nodes of the acceleration structure when a quantity of nodes in the set of candidate nodes satisfies a node quantity parameter.

4. The system of claim 1, wherein testing the one or more volumes against the acceleration structure begins at a top level of the acceleration structure.

5. The system of claim 1, wherein identifying the set of candidate nodes comprises:

identifying an initial set of nodes of the acceleration structure by testing the one or more volumes against the acceleration structure;

comparing a quantity of nodes in initial set of nodes to a node quantity parameter;

after determining that the quantity of nodes in the initial set of nodes is equal to or less than the node quantity parameter, defining the initial set of candidate nodes as the set of candidate nodes; and after determining that the quantity of nodes in initial set of nodes is greater than the node quantity parameter:
modifying the initial set of nodes to obtain a modified set of nodes by replacing at least two nodes of the initial set of nodes with a higher-level node that encompasses the at least two nodes; and
defining the modified set of nodes as the set of candidate nodes.

6. The system of claim 1, wherein identifying the set of candidate nodes comprises:

identifying an initial set of nodes of the acceleration structure by testing the one or more volumes against the acceleration structure;

obtaining a modified set of nodes by replacing at least one node of the initial set of nodes with a higher-level node; and defining the modified set of nodes as the set of candidate nodes.

7. The system of claim 6, wherein the higher-level node is selected to:

substantially encompass the one or more volumes, substantially encompass a structure within the virtual environment that encompasses the one or more volumes, or substantially encompass a second volume determined based upon a range of perception associated with the virtual environment.

8. The system of claim 6, wherein the higher-level node comprises a top-level node of the acceleration structure.

9. The system of claim 1, wherein performing the ray trace operation based upon the set of candidate nodes comprises testing one or more rays against one or more nodes of the set of candidate nodes to determine one or more intersected object components of the one or more object components of the virtual environment.

10. The system of claim 9, wherein the instructions are executable by the one or more processors to configure the system to order nodes of the set of candidate nodes in accordance with an importance factor.

11. The system of claim 10, wherein the importance factor comprises (i) proximity to an average ray origin or camera position associated with the ray trace operation or (ii) node level within the acceleration structure.

12. The system of claim 10, wherein performing the ray trace operation comprises testing the one or more rays against the one or more nodes of the set of candidate nodes in accordance with the ordering of the nodes of the set of candidate nodes.

13. The system of claim 9, wherein performing the ray trace operation comprises refraining from testing the ray against remaining nodes of the acceleration structure not included in the set of candidate nodes.

14. The system of claim 9, wherein performing the ray trace operation further comprises testing the ray against remaining nodes of the acceleration structure, and wherein testing the ray against the remaining nodes of the acceleration structure comprising refraining from re-testing the ray against any node in the set of candidate nodes.

15. The system of claim 1, wherein the one or more volumes comprise one or more view frustum volumes.

16. The system of claim 15, wherein the one or more view frustum volumes comprise a plurality of view frustum volumes, each of the plurality of view frustum volumes being associated with a respective set of rays of the ray trace operation, and wherein the set of candidate nodes comprises a respective subset of candidate nodes for each view frustum volume of the plurality of view frustum volumes.

17. The system of claim 1, wherein the one or more volumes comprise one or more of: a volume extended from a source object within the virtual environment, a volume associated with a range of perception, or a volume associated with a structure within the virtual environment.

18. A method for facilitating ray trace operations with shared traversal, comprising:

performing a pre-test operation, the pre-test operation comprising:
testing one or more volumes against an acceleration structure associated with a virtual environment to identify a set of candidate nodes of the acceleration structure, the virtual environment comprising one or more virtual objects defined by one or more object components, wherein testing the one or more volumes against the acceleration structure comprises, for each traversed node of the acceleration structure:
after determining that no child nodes of the traversed node intersect with or are contained by the one or more volumes, refraining from traversing child nodes of the traversed node;

after determining that at least one but fewer than all child nodes of the traversed node intersect with or are contained by the one or more volumes, traversing the at least one but fewer than all child nodes of the traversed node; and after determining that all child nodes of the traversed node intersect with or are contained by the one or more volumes, or after determining that the traversed node includes no child nodes, including the traversed node in the set of candidate nodes; and performing a ray trace operation based upon the set of candidate nodes of the acceleration structure.

19. One or more hardware storage devices that store instructions that are executable by one or more processors of a system to configure the system to:

perform a pre-test operation, the pre-test operation comprising:

testing one or more volumes against an acceleration structure associated with a virtual environment to identify a set of candidate nodes of the acceleration structure, the virtual environment comprising one or more virtual objects defined by one or more object components, wherein testing the one or more volumes against the acceleration structure comprises, for each traversed node of the acceleration structure:

after determining that no child nodes of the traversed node intersect with or are contained by the one or more volumes, refraining from traversing child nodes of the traversed node;

after determining that at least one but fewer than all child nodes of the traversed node intersect with or are contained by the one or more volumes, traversing the at least one but fewer than all child nodes of the traversed node; and after determining that all child nodes of the traversed node intersect with or are contained by the one or more volumes, or after determining that the traversed node includes no child nodes, including the traversed node in the set of candidate nodes; and perform a ray trace operation based upon the set of candidate nodes of the acceleration structure.

* * * * *